March 12, 1935.                C. G. SUITS                1,994,325
                            ELECTRIC CIRCUITS
                            Filed May 26, 1932
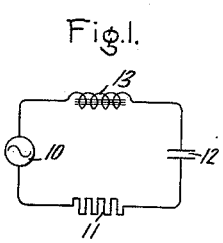
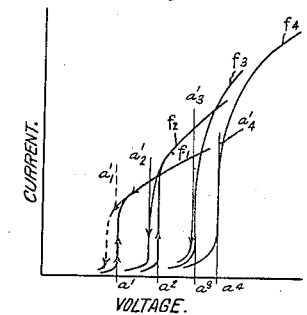
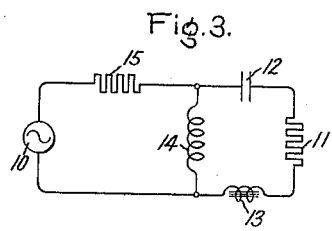
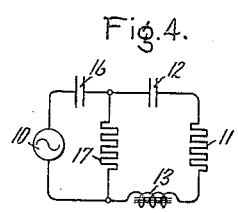
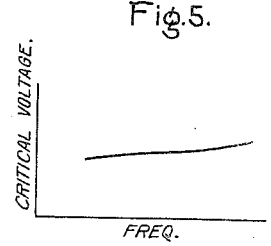
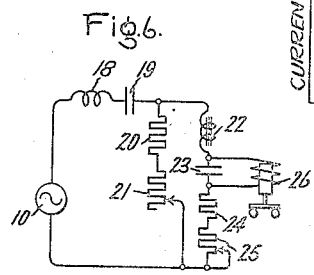
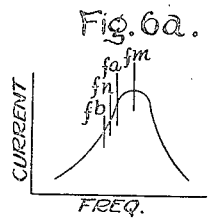
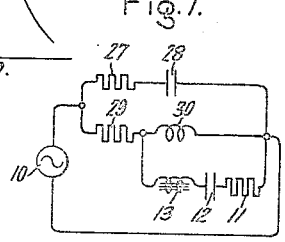
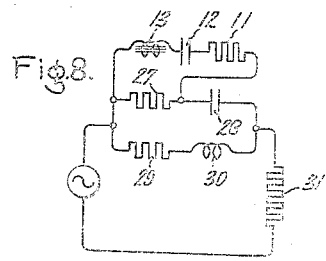
Inventor:
Chauncey G. Suits,
by *Charles E. Tulla*
His Attorney.

Patented Mar. 12, 1935

1,994,325

UNITED STATES PATENT OFFICE 1,994,325

ELECTRIC CIRCUITS

Chauncey G. Suits, Schenectady, N. Y., assignor to General Electric Company, a corporation of New York Application May 26, 1932, Serial No. 613,696

20 Claims. (Cl. 171—97)

My invention relates to alternating current electric circuits and more particularly to electric circuits which have non-linear volt-ampere characteristics and are sensitive in certain characteristic phenomena to variations in the frequency of the source of energization.

It has been known for some time that certain unusual resonance effects occur in circuits employing capacitances in combination with inductances having closed iron cores which are adapted to saturate magnetically. These effects are strikingly different from the well known properties of resonance circuits where the flux path of the inductive element is almost wholly in air. Electric networks comprising circuit elements of inductance, capacitance and resistance, which depend upon current, are with unimportant exceptions distinguished by non-linear volt-ampere characteristics. Throughout the specification and claims "non-linear" element or circuit will be used to designate an element or circuit having a non-linear volt-ampere characteristic for effective values of alternating current.

If a circuit comprising a series connected resistance, capacitance, and saturable inductance is properly dimensioned it will be observed that for a gradually increasing voltage of constant frequency, the effective current is not proportional to the voltage but increases critically at a certain voltage. Similarly, for a gradually decreasing voltage at constant frequency the effective current decreases critically at a certain voltage. For convenience I refer to the voltage at which the sudden increase of current takes place as the "resonant" voltage and the voltage at which the sudden decrease of current takes place as the "dissonant" voltage.

The resonant voltage of the type of circuit described above depends upon frequency and it has been found that the resonant voltage increases approximately 1% for a 1% increase in frequency. This linear relation holds for a substantially wide range of frequency variation. When the non-linear circuit is used on frequency maintained systems the dependence of the resonant and dissonant voltages upon frequency has not been an impediment to its use. These characteristic voltages have a further dependence upon the wave form of the applied voltage of such nature that for increasing harmonic content of the supply source the resonant and dissonant voltages increase. There are applications of this circuit to control equipment of high accuracy where it is desirable to eliminate or reduce the dependence of the resonant and dissonant voltages upon both the frequency and the wave form of the voltage to be controlled. Means have been proposed heretofore for reducing the dependence of the properties of non-linear circuits upon frequency but it has been found that these means have the objectionable effect of amplifying the harmonic components in the wave form applied to the non-linear circuit, thereby causing the resonant and dissonant voltages to have an increased dependence on this factor.

It is an object of my invention to provide an improved arrangement of electric circuits having non-linear volt-ampere characteristics which will operate substantially independently of variations in the frequency of the source throughout the operating range of the circuit.

It is another object of my invention to provide an improved frequency compensating circuit for non-linear circuits which will reduce to a minimum errors due to harmonics in the supply voltage.

In accordance with my invention I provide a circuit comprising a plurality of impedance elements having a branch voltage which changes linearly with the frequency of the supply voltage and energize the non-linear circuit with this voltage as a source. The non-linear circuit is preferably connected across that impedance element of the frequency compensating circuit which suppresses the harmonic components of the voltage of the source a maximum amount.

My invention will be better understood from the following description taken in connection with the accompanying drawing and its scope will be pointed out in the appended claims.

In the drawing, Fig. 1 is an elementary circuit diagram of a series type of non-linear circuit for more clearly explaining my invention; Fig. 2 is a curve showing the variation in resonant and dissonant voltages of the elementary circuit shown in Fig. 1 with variations in the frequency of the voltage of the source; Fig. 3 is one embodiment of my invention utilizing an inductance and a resistance in the frequency compensating circuit; Fig. 4 is a modification of the embodiment of my invention illustrated in Fig. 3 wherein a capacitance-resistance circuit has been substituted for the resistance-inductance branch; Fig. 5 is a curve showing the change in critical voltage with change in frequency of the embodiment of my invention illustrated in Fig. 4; Fig. 6 is a further modification of my invention utilizing an inductance, a capacitance, and a resistance in series relation in the frequency compensating circuit; Fig. 6a is an explanatory curve showing the general shape of the current-frequency curve for the linear circuit of Fig. 6 and Figs. 7 and 8 are further modifications of my invention wherein a capacitance and resistance, and inductance and resistance are connected in parallel relation for the frequency compensating circuit.

Referring to the drawing and for the moment particularly to Figs. 1 and 2, 10 indicates a source of alternating voltage which is connected to energize a series non-linear circuit comprising a resistance 11, a capacitance 12 and a substantially closed iron core inductance 13. This simple series non-linear circuit is known to exhibit the volt-ampere characteristics shown in Fig. 2. For a frequency $f_1$ the resonant voltage for the circuit will have a value $a_1$ and a dissonant voltage $a'_1$; for a frequency $f_2$, a resonant voltage $a_2$ and a dissonant voltage $a'_2$; for a frequency $f_3$, a resonant voltage $a_3$ and a dissonant voltage $a'_3$ and for a frequency $f_4$, a resonant and dissonant voltage of $a_4$. Thus it will be observed that the resonant and dissonant voltages for this circuit depend upon frequency. The particular curves of Fig. 2 were taken for the circuit of Fig. 1 for frequencies between 35.2 cycles per second to 61 cycles per second.

I have found that the frequency dependence may be reduced or removed if a circuit is available which produces a voltage that rises linearly with frequency for in that event the simple series circuit may be energized with this voltage as a source. As the frequency and the voltage supplying both circuits rise the branch voltage supplying the non-linear circuit rises in such a manner that the current in the non-linear branch tends to remain constant. Tests have shown, however, that when the wave form applied to the non-linear circuit is not sinusoidal, but contains harmonics, the resonant and dissonant voltages will change from this cause. Under these conditions it is necessary to provide a circuit which will compensate for both the frequency error and the wave form error.

In Fig. 3 I have illustrated one embodiment of my invention which provides frequency compensation. The frequency compensating circuit comprises a linear or constant inductance 14 and a resistance 15 connected in series across the source 10. The non-linear circuit, identical with the non-linear circuit of Fig. 1 comprising the series connected resistance 11, capacitance 12 and saturable inductance 13, is connected across the inductance 14 of the frequency compensating circuit.

The voltage across the inductance 14 in the linear branch circuit including the source 10 and the resistance 15 is given by the expression $$\frac{LE\omega}{\sqrt{R^2+(L\omega)^2}},$$

wherein E=the voltage in volts of source 10, $\omega L = 2\pi fL$ =the inductive reactance of the inductance 14 where L is the inductance in henrys, and R=the resistance in ohms of the resistor 15. It may be seen that in the event that $R^2$ is large compared to $(L\omega)^2$ that the inductance voltage rises substantially linearly with frequency, applied voltage remaining constant. Hence a necessary requirement is that the voltage across the inductance element be small in comparison to the voltage across the resistance. This circuit, therefore, provides frequency compensation.

In Fig. 4 I have illustrated another embodiment of my invention which comprises a capacitance-resistance circuit comprising linear elements indicated as a capacitance 16 and a resistance 17 connected in series across the source 10. The non-linear circuit, which is illustrated as the non-linear circuit of Fig. 1 comprising the series connected resistance 11, capacitance 12 and the saturable inductance 13, is connected across the resistance 17 of the frequency compensating circuit.

The voltage across resistor 17 in the linear branch circuit including the source 10 and capacitance 16 is given by the expression $$\frac{RE}{\sqrt{R^2+\left(\frac{1}{C\omega}\right)^2}},$$

wherein E=the voltage in volts of source 10, $$\frac{1}{C\omega}=\frac{1}{2\pi fC}=$$

the capacitive reactance of the capacitance 16 where C is the capacitance in farads, and R=the resistance in ohms of the resistor 17. It may be seen that in the event $$\left(\frac{1}{C\omega}\right)^2$$

is large compared to $R^2$ the resistance voltage rises linearly with frequency, when the supply voltage remains constant. Hence for proper frequency compensation it is necessary that the voltage across the capacitance be large in comparison to the voltage across the resistance. In a given circuit for which data were taken, the capacitive reactance was chosen approximately four times the resistance. No substantial improvement was noted in operation with a larger reactance-resistance ratio. However, it was noted that the frequency compensation is reduced if a reactance-resistance ratio of much less than 3:1 is chosen. Measurement taken of the change of critical voltage with frequency for the circuit of Fig. 4 were taken and are shown by way of illustration in Fig. 5. It will be observed that the resonant voltage changes very slowly with frequency and it was observed that a 1% change in frequency resulted in a change in resonant voltage of but .08%. Thus this particular frequency compensating circuit is capable of reducing the frequency error of the simple series circuit twelve times thereby rendering the circuit practically independent of frequency variations.

When harmonic frequencies appear in the supply voltage it will be apparent after a consideration of the electrical properties of the circuit that the relative amplitude of the harmonic frequencies in the voltage across the resistance will be large. In fact, each harmonic component will be amplified in proportion to its frequency in the resistance element for the relative magnitudes of the capacitance and resistance required to secure frequency compensation. Since the wave form error is magnified in this type of frequency compensation circuit it is not suitable for use where the wave form of the supply voltage departs an appreciable extent from the sinusoid.

In Fig. 6 I have shown another modification of my invention in which the compensating circuit includes three linear impedance elements arranged for series resonance comprising an inductance 18, a capacitance 19, a fixed resistance 20, and a variable resistance 21, all connected in series relation across the source 10. A non-linear circuit of the type shown in Fig. 1 and comprising a saturable inductance 22, a capacitance 23, a fixed resistance 24 and a variable resistance 25, are connected in series across the resistances 20 and 21 of the frequency compensating circuit. An electroresponsive device 26 is connected across the capacitance 23 of the non-linear circuit for operation in accordance with the voltage across the capacitance. When a linear series resonance circuit is thus used for frequency compensation, it is possible to obtain a branch voltage such that the percentage change in this voltage is greater than the percentage change in frequency. The direction of change in voltage with frequency depends upon the relative magnitudes of the inductance 18 and the capacitance 19, and the degree of change with frequency depends upon the relative magnitudes of the inductance 18, the capacitance 19 and the resistances 20 and 21.

Maximum compensating effect is obtained when the constants of the frequency compensating circuit are adjusted so that the point of inflection of the current frequency curve for the linear circuit is at the normal frequency of the circuit to be controlled. It is further required that the frequency-current curve have a positive slope at this point. Then for a limited region above or below the normal frequency the current in the frequency compensating circuit will change linearly. Beyond this limited region either above or below normal frequency the change in current with frequency decreases from the maximum value. Fig. 6a shows the general shape of the current-frequency curve for the linear circuit of Fig. 6 wherein the point $f_m$ indicates the frequency at which resonance occurs, the point $f_n$ indicates the point of inflection or the point of normal frequency, and the points $f_a$ and $f_b$ mark the frequency boundaries beyond which the current changes non-linearly with frequency. I have found that satisfactory operation is obtained when the capacitance and reactor of the frequency compensating circuit are so adjusted that the point of inflection of the current frequency curve occurs at 60 cycles for a 60 cycle system and the resonant peak occurs between 65 and 90 cycles. With the value of the voltage selected for the pick-up value of relay 26, impressed upon the frequency compensating circuit, the resistor 21 is so adjusted that the voltage drop across the total resistance is sufficient to bring the non-linear circuit into resonance. With the constants of the frequency compensating circuit adjusted for satisfactory compensation, an increase or decrease in frequency will cause an increase or decrease in the voltage drop across the resistances 20—21. This increase or decrease in voltage drop corresponds to the increase or decrease in the resonant voltage for the same change in frequency, so that for a given impressed voltage across the frequency compensating circuit, the relay will pick up at this voltage over a range in frequency variation of the order of several cycles. A similar constancy and drop-out of the relay is obtained due to change in dissonant voltage by the change in current in the frequency compensating circuit resistance.

With the frequency compensating circuit shown in Fig. 6 it is possible to shunt the non-linear circuit across any one element or combinations of any two elements. However, it has been noted that if this circuit is used the fundamental frequency calculated by the ordinary means will not differ greatly from the frequency of the supply voltage. That is, if the point of inflection of the frequency current curve occurs close to the normal frequency of the supply voltage, the current drawn under conditions of resonance by the compensating circuit tends to be sinusoidal even though the supply voltage includes harmonic frequencies. If the supply voltage contains these harmonic frequencies and if the voltage across the resistor tends to have a sinusoidal wave form, the voltages of the inductance and capacitance elements must have a greater harmonic content than the supply voltage since, at any instant, all the voltages in the circuit must equal the supply voltage. Hence the preferred position of the non-linear source is in parallel with the resistance, if the effect of wave form distortion is to be minimized.

In Fig. 7 I have shown another embodiment of my invention in which a resonant circuit of the parallel type is employed for the frequency compensating circuit. In this arrangement I connect a branch circuit comprising a resistance 27 in series relation with a capacitance 28 in parallel relation with a branch circuit comprising a resistance 29 in series relation with an inductance 30 across the source 10. The non-linear circuit which is illustrated as the non-linear circuit of Fig. 1 comprising the series connected resistance 11, capacitance 12 and saturable inductance 13, is preferably connected across the inductance 30, as shown, in order to minimize wave distortion error in accordance with the principles discussed in connection with the arrangement illustrated in Fig. 6.

In Fig. 8 I have shown a modification of the embodiment illustrated in Fig. 7 in which a resistance 31 is connected in series relation with the parallel resonant circuit in order to provide a means to effect a disproportionate change with frequency in a branch voltage of the parallel circuit in case it is desirable to over or undercompensate for changes in frequency. In this instance it is preferable to connect the non-linear circuit across the resistance 27 which is in series relation with the capacitance 28 in order to minimize the wave distortion error.

While I have shown and described various embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a source of alternating current, means comprising a plurality of impedance elements connected in circuit with said source for providing a branch voltage which changes linearly with variations in the frequency of said source and has a maximum amplitude less than the applied voltage, and an impedance network having a non-linear volt-ampere characteristic connected to be energized in accordance with said branch voltage.

2. In combination, a source of alternating current, means comprising a plurality of impedance elements connected in series relation with said source for providing a branch voltage across one of said impedance elements which changes linearly with variations in the frequency of said source and has a maximum amplitude substantially less than the applied voltage, and an impedance network having a non-linear volt-ampere characteristic connected to be energized in accordance with the voltage across only said one impedance element.

3. In combination, a source of alternating current, means comprising a plurality of impedance elements connected in circuit with said source for providing a branch voltage in the circuit of said impedances which changes linearly with variations in the frequency of the voltage of said source and in which the amplitude of the harmonic frequencies is a minimum relative to the maximum amplitude of the harmonic voltages in any other branch voltage of the circuit of said impedances, and an impedance network having a non-linear volt-ampere characteristic connected to be energized in accordance with said first mentioned branch voltage.

4. In combination, a source of alternating voltage, means comprising a plurality of impedance elements connected in circuit with said source, and an impedance network having a non-linear volt-ampere characteristic being connected in parallel relation with one of said impedance elements across which the voltage changes linearly with variations in the frequency of said source and in which the amplitude of the harmonic frequencies is a minimum.

5. In combintaion, a source of alternating voltage, an inductance and a resistance connected in series relation with said source, and a circut having a non-linear volt-ampere characteristic connected in parallel relation with said inductance.

6. In combination, a source of alternating voltage, an inductance and a resistance connected in series relation with said source, said inductance having a reactance in ohms substantially less than said resistance, and a non-linear circuit connected to be energized in accordance with the voltage across said inductance.

7. In combination, a source of alternating voltage, an inductance and a resistance connected in series relation with said source, said inductance having a reactance in ohms substantially less than said resistance, and a circuit comprising a resistance, a capacitance and a saturable inductance connected in series relation across said first mentioned inductance.

8. In combination, a source of alternating voltage, a capacitance and a resistance connected in series relation with said source, and a circuit having a non-linear volt-ampere characteristic connected in parallel relation with said resistance.

9. In combination, a source of alternating voltage, a capitance and a resistance connected in series relation with said source, said capacitance having a reactance in ohms substantially greater than said resistance, and a non-linear circuit connected to be energized in accordance with the voltage across said resistance.

10. In combination, a source of alternating voltage, a capacitance and a resistance connected in series relation with said source, the ratio of reactance to resistance of said capacitance and resistance elements being of the order of four to one, and a non-linear circuit connected to be energized in accordance with the voltage across said resistance.

11. In combination, a source of alternating voltage, a capacitance and a resistance connected in series relation with said source, said capacitance having a reactance in ohms substantially greater than the said resistance, and a circuit comprising a resistance, a capacitance and a saturable inductance connected in series relation across said first mentioned resistance.

12. In combination, a source of alternating voltage, a plurality of impedance elements comprising a capacitance, a resistance, and an inductance connected in a circuit with said source and having a resonant frequency higher than the normal frequency of said source, and a non-linear circuit connected to be energized from the circuit of said impedance elements in accordance with a branch voltage which changes linearly with variations in the frequency of said source.

13. In combination, a source of alternating voltage, a plurality of impedance elements comprising a capacitance, a resistance, and an inductance connected in series relation with said source and having a resonant frequency slightly higher than the normal operating frequency of said source, and a non-linear circuit connected to be energized from the circuit of said impedance elements in accordance with a branch voltage which changes linearly with variations in the frequency of said source and in which the amplitude of the harmonic frequencies is a minimum relative to the maximum amplitude of the harmonic voltages in any other branch voltage of said impedance circuit.

14. In combination, a source of alternating voltage subject to variations in frequency, a linear circuit including a capacitance, a resistance, and an inductance connected in series relation with said source for providing a voltage across said resistance which changes linearly with variations in the frequency of said source, and a non-linear circuit having an operating condition variable in accordance with variations in the frequency of the voltage applied thereto connected to be energized across said resistance.

15. In combination, a source of alternating voltage, a capacitance, a resistance, and an inductance connected in series relation with said source and being adjusted to have the point of inflection of the frequency current curve occur close to the normal frequency of the supply voltage, and a capacitance, a resistance and a saturable inductance being connected in series relation across said first mentioned resistance.

16. In combination, a source of alternating voltage, a linear circuit comprising a capacitance, a resistance and an inductance connected in series relation with said source for providing a voltage across said resistance which changes linearly with variations in the frequency of said source, and a non-linear circuit comprising a capacitance, a resistance and a saturable inductance connected in series relation across the resistance of said linear circuit.

17. In combination, a source of alternating voltage, a linear circuit comprising a capacitance, a resistance, and an inductance connected in series relation across said source for providing a voltage across said resistance which changes linearly with variations in the frequency of said source, means for adjusting the resistance of said linear circuit, and a non-linear circuit comprising a capacitance, a resistance and a saturable inductance connected in series relation across the resistance of said linear circuit.

18. In combination, a source of alternating voltage, a plurality of impedances comprising a capacitance and resistance connected in parallel relation with an inductance and a resistance across said source, and a non-linear circuit connected to be energized in accordance with the voltage across an impedance in one branch of said parallel circuit.

19. In combination, a source of alternating voltage, a linear circuit comprising a capacitance and a resistance connected in parallel relation with an inductance and a resistance across said source, and a non-linear circuit connected to be energized in accordance with the voltage across said inductance.

20. In combination, a source of alternating voltage, a linear circuit comprising a capacitance and a resistance connected in parallel relation with an inductance and a resistance across said source, a resistance connected in series relation with said parallel branch, and a non-linear circuit connected to be energized in accordance with the voltage across the resistance in series circuit with said capacitance.

CHAUNCEY G. SUITS.